United States Patent [19]
Kocher et al.

[11] Patent Number: 6,023,285
[45] Date of Patent: Feb. 8, 2000

[54] ESTABLISHMENT OF CALIBRATION OF A PHOTOTHERMOGRAPHIC LASER PRINTER AND PROCESSOR SYSTEM

[75] Inventors: Thomas E. Kocher, Rochester; Kwok L. Yip, Webster, both of N.Y.

[73] Assignee: Eastman Kodak Company, Rochester, N.Y.

[21] Appl. No.: 08/979,316

[22] Filed: Nov. 26, 1997

[51] Int. Cl.[7] .............................. B41J 2/47; H01S 3/00; H04N 1/21
[52] U.S. Cl. .................... 347/247; 347/251; 358/298
[58] Field of Search .................... 347/226, 228, 347/251–254, 262, 264, 233, 240; 355/27, 68, 38; 399/181; 358/298, 455, 456, 302; 372/26, 38; 345/418; 386/128

[56] References Cited

U.S. PATENT DOCUMENTS

| | | | |
|---|---|---|---|
| 4,278,347 | 7/1981 | Okamoto et al. | 347/226 |
| 4,757,334 | 7/1988 | Volent | 347/228 |
| 4,764,793 | 8/1988 | Goll et al. | 355/38 |
| 4,939,581 | 7/1990 | Shalit | 386/128 |
| 5,170,257 | 12/1992 | Burns | 358/298 |
| 5,281,979 | 1/1994 | Krogstad | 347/247 |
| 5,457,541 | 10/1995 | Burns | 358/298 |
| 5,481,657 | 1/1996 | Schubert et al. | 345/418 |
| 5,721,623 | 2/1998 | Boxma | 358/448 |
| 5,764,664 | 6/1998 | Yip et al. | 372/26 |

FOREIGN PATENT DOCUMENTS

95/30934 11/1995 WIPO.

*Primary Examiner*—N. Le
*Assistant Examiner*—L. Anderson
*Attorney, Agent, or Firm*—William F. Noval

[57] ABSTRACT

In a photothermographic laser imaging system including a laser printer for exposing photothermographic media to digital data, a thermal processor for thermally developing the exposed photothermographic media to render a visual image of the digital data and a densitometer for reading the density of the visual image, a method for establishing calibration of the system comprising the steps of: reading optimum thermal processing parameters including processor temperature from a bar code associated with unexposed photothermographic media; setting the thermal processor to operate at the read parameters; exposing a calibration media by the laser printer, the calibration media including a multiple step gray scale pattern including a minimum density step, $D_{min}$, and an upper density step, $D_{UDP}$; reading with the densitometer the densities of the multiple step gray scale pattern from the developed calibration media; calculating a code value to optical density look-up-table from the read densities; and if the $D_{min}$ and $D^{UDP}$ values are within tolerances, using the calculated look-up-table to process successive media; but if the $D_{min}$ is greater than a predetermined value, adjusting the thermal processor temperature down, and if said $D_{UDP}$ is less than a predetermined value, adjusting the thermal processor temperature up.

1 Claim, 2 Drawing Sheets

ESTABLISHMENT OF CALIBRATION OF A PHOTOTHERMOGRAPHIC LASER PRINTER AND PROCESSOR SYSTEM

FIELD OF THE INVENTION

This invention relates in general to laser imaging systems and relates more particularly to the calibration of a photothermographic printer and processor system.

BACKGROUND OF THE INVENTION

Laser printers that reproduce digital medical images on film have found increasing usage in the health care industry. Conventional laser printers produce films which are chemically processed to develop the images on the film. Photothermographic printers have recently been introduced that employ heat instead of chemical processing to develop the images. A photothermographic laser printer exposes the photothermographic film to a laser beam raster scanned on the film to produce a latent image. The exposed photothermographic film is thermally processed to develop the latent image into a visible image.

Photothermographic or dry laser printers have the following advantages: 1) customer convenience and reduced operating costs by not having to buy or dispose of chemistry or repair wet processors; 2) reduction in site preparation costs by not having to install water pipes and drains; and 3) higher reliability of dry printers by eliminating wet processors.

In order to produce uniformly exposed and processed laser printed film, it is necessary to calibrate the printer/processor system. Calibration is a process by which the inherent non-linear curve (input digital image code value vs. film output density) of the laser scan engine, film, and processor is systematically standardized to a linear code value to output density response curve. In addition, calibration maintains this response over time by compensating for the variation to all sub-components of the system.

The following disclose imaging systems which use the output density of developed film to change the exposure of the film to calibrate the system. U.S. Pat. No. 4,278,347, issued Jul. 14, 1981,inventors Okamoto et al.; U.S. Pat. No. 4,757,334, issued Jul. 12, 1988, inventor Valent; PCT unexamined International Patent Application WO 95/30934, published Nov. 16, 1995, inventors Star et al. There is no disclosure in any of the above of changing processor parameters to establish and maintain calibration of the system.

SUMMARY OF THE INVENTION

According to the present invention, there is provided a solution to the problems of the prior art.

According to a feature of the present invention, there is provided a photothermographic laser imaging system including a laser printer for exposing photothermographic media to digital data, a thermal processor for thermally developing the exposed photothermographic media to render a visual image of the digital data and a densitometer for reading the density of the visual image, a method for establishing calibration of the system comprising the steps of: reading optimum thermal processing parameters including processor temperature from a bar code associated with unexposed photothermographic media; setting the thermal processor to operate at the read parameters; exposing a calibration media by the laser printer, the calibration media including a multiple step gray scale pattern including a minimum density step, $D_{min}$, and an upper density step, $D_{UDP}$; reading with the densitometer the densities of the multiple step gray scale pattern from the developed calibration media; calculating a code value to optical density look-up-table from the read densities; and if the $D_{min}$ and $D_{UDP}$ values are within tolerances, using the calculated look-up-table to process successive media; but if the $D_{min}$ is greater than a predetermined value, adjusting the thermal processor temperature down, as if a $D_{UDP}$ is less than a predetermined value, adjusting the thermal processor temperature up.

ADVANTAGEOUS EFFECT OF THE INVENTION

The invention has the following advantages.

1. The inherent non-linear characteristic curve in terms of code value (CV) vs. optical density (OD) of the laser scanner, photothermographic film, and thermal processor is automatically calibrated to a linear CV vs. OD response curve.

2. The linear CV vs. OD response is maintained over time by compensating for variations to all system sub-components.

3. The minimum density and customer designated upper density point specifications are met and maintained.

DETAILED DESCRIPTION OF THE INVENTION

Figure 1:
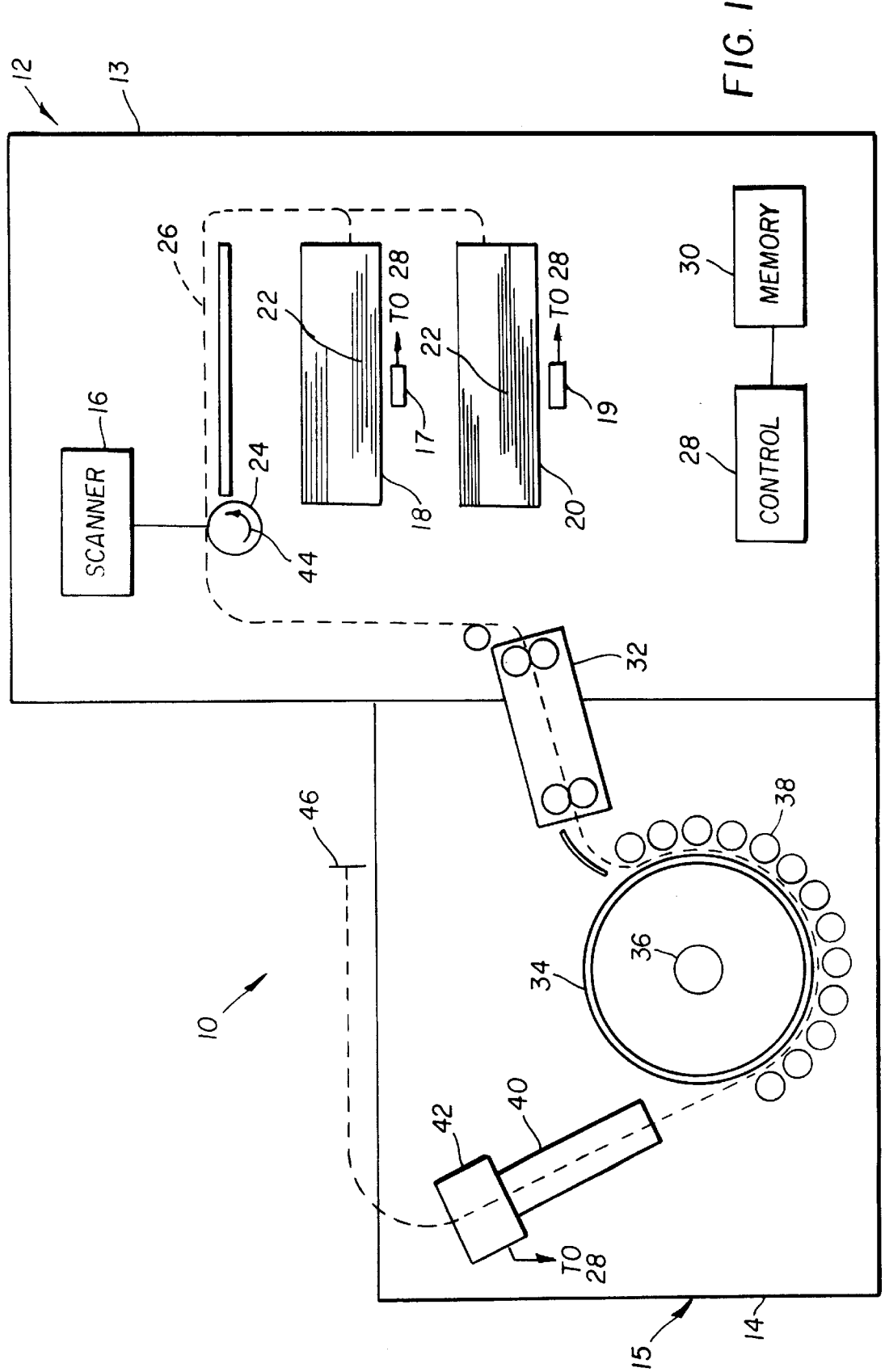
FIG. 1 is a diagrammatic view of photothermographic laser imaging and thermal processing apparatus incorporated the present invention.

Referring now to FIG. 1, there is shown laser imaging apparatus incorporating the present invention. As shown, apparatus 10 includes a laser printer 12 and processor 14. Although printer 12 and processor 14 are shown as housed in separate units, it will be understood that they could be integrated into one housing. In the specific application described here, printer 12 is a medical image laser printer for printing medical images on photothermographic film which is thermally processed by thermal processor 14. The medical images printed by printer 12 can be derived from medical image sources, such as medical image diagnostic scanners (MRI, CT, US, PET), direct digital radiography, computed radiography, digitized medical image media (film, paper), and archived medical images.

Printer 12 includes printer housing 13, laser scanner 16, supplies 18,20 for packaging of unexposed photothermographic film 22, bar code scanners 17,19 for reading bar codes on packaging of film 22, a slow scan drum 24, film path 26, control 28, memory 30, printer/processor film interface 32. Processor 14 includes processor housing 15, interface 32, drum 34 heated by lamp 36, hold-down rollers 38 located around a segment of the periphery of drum 34, exposed film cooling assembly 40, densitometer 42, and output tray 46.

Apparatus 10 operates in general as follows. A medical image stored in memory 30 modulates the laser beam produced by the laser of scanner 16. The modulated laser beam is repetitively scanned in a fast or line scan direction to expose photothermographic film 22. Film 22 is moved in a slow or page scan direction by slow scan drum 24 which rotates in the direction of arrow 44. Unexposed photothermographic film 22, located in supplies 18, 20, is moved along film path 26 to slow scan drum 24. A medical image is raster scanned onto film 22 through the cooperative operation of scanner 16 and drum 24.

After film 22 has been exposed, it is transported along path 26 to processor 14 by printer/processor film interface 32. The exposed film 22 is developed by passing it over heated drum 34 to which it is held by rollers 38. After development, the film 22 is cooled in film cooling assembly 40. Densitometer 42 reads the density of control patches at the front edge of film 22. The cooled film 22 is output to tray 46 where it can be removed by a user. Data read by bar code scanners 17, 19 and densitometer 42 are sent to control 42 which uses the data to establish and maintain calibration of apparatus 10.

There will now be described system calibration. Printer processor system calibration is a process by which the inherent non-linear characteristic curve, in terms of Code Value (CV) vs. Optical Density (OD), of the laser exposure scanner 16, film 22, and processor 14 is systematically standarized to a linear CV to OD response curve (establishing calibration). In addition, calibration maintains this response over time by compensating for the variations to all sub-components (maintaining calibration). This process will ensure that the $D_{min}$ and customer upper density point ($D_{UDP}$) specifications are met and maintained, as well as the linear characteristic response.

The laser exposure scanner is calibrated for polygon scanner facet reflectivity, modulator efficiency, and laser power.

Figure 2:
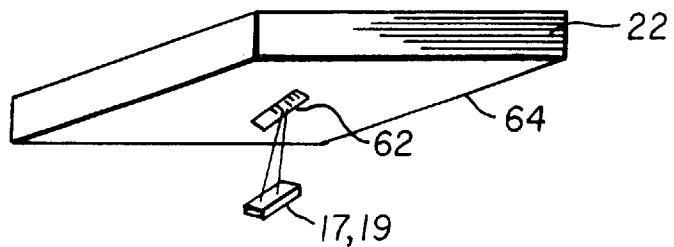
FIG. 2 is a diagrammatic view illustrating bar code scanning in the apparatus of FIG. 1.

The following data is read by bar code scanners 17,19 from bar code labels 60 on the film 22 package 64 (FIG. 2):

a) emulsion number b) optimum processing (t)ime, [seconds]

c) optimum processing (T)emperature, [° C.]

Figure 3:
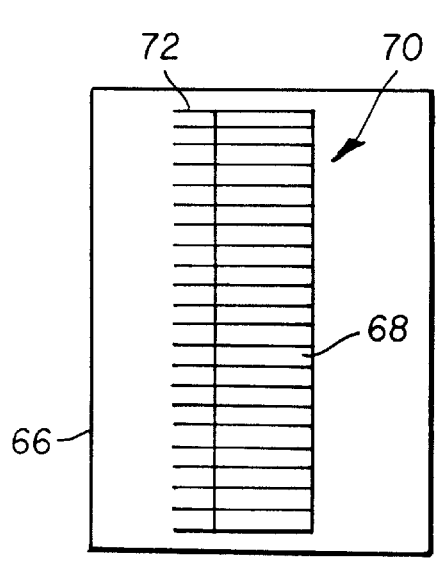
FIGS. 3–6 are diagrammatic views of illustrative media useful in explaining the operation of the apparatus shown in FIG. 1.

The calibration film 66 (FIG. 3) consists of a 21-step 68 gray scale pattern 70 exposed by the printer 12. Each step 68 is printed with a corresponding fiducial mark 72 which is used by the built-in densitometer 42 to trigger a density reading for that step. The calibration image does not have a density patch. The code values used to create the 21 steps are such that the full optical density dynamic range is covered ($D_{min}$, to $D_{UDP}$) and the response curve is sufficiently characterized so that the calibration algorithm will be able to produce the desired linear response.

Figure 4:
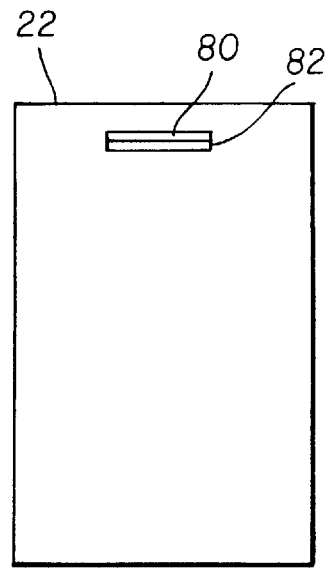

Referring to FIG. 4, each film 22 has density patch which resides in the leading edge border area of the film and is positioned such that any processor variations are avoided and be robust to film alignment issues. The density patch will contain two density levels 80,82 that represent the current sate of exposure/processing of code values 0 ($D_{min}$) and 2048 ($D_{mid}$). The densitometer 42 will use the edge of the film as the trigger to begin density readings in the continuous mode. The location and density value of the patch will be determined by trigger time from the edge of the film and calculate point slopes.

Figure 5:
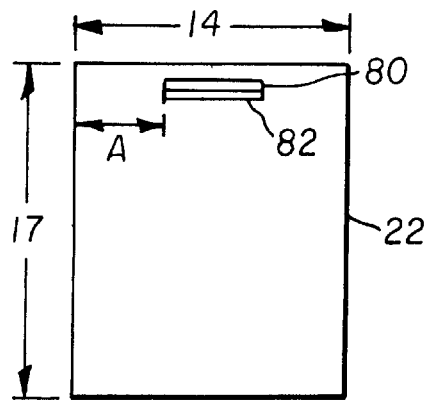
Figure 6:
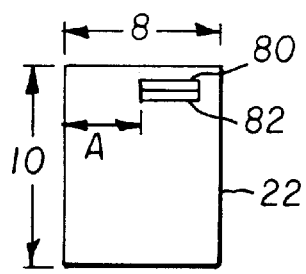

The density patches are located the same distance A from the left edge of the film regardless of film size. This allows proper reading by the fixed densitometer 42 without the necessity of either moving the film or the densitometer for different sized films. FIGS. 5 and 6 show the location of patches 80,82 for 14"×17" and 8"×10" films.

The following data shall be used to establish and maintain calibration:

a) Optical density values read from 21 step calibration film.

b) Optical density data from patches on each film.

c) Trigger and time from the edge of the film.

d) Calculate point slopes.

The following guidelines have been established for calibration:

Calibration is established with a 21-step calibration film.

Calibration is maintained by adjusting thermal process.

Calibration does NOT have short term control of the processor (response is the result of averaging n films or a preset period of time).

Calibration accommodates for long term sensor drift in the thermal processor.

Recommended thermal processing conditions (TPC).

The printer has the ability to set the desired temperature. The printer does know the temperature of the processor, only if it is operating at the desired temperature.

Change LUTs only when establishing calibration.

Film processing T/t curve is stable and defined.

Image tone T/t space is stable and defined.

The following data is used to determine the threshold values for establishing and maintaining calibration:

| Metric | Measurement | Specification |
| --- | --- | --- |
| Density range | $D_{min}$ | $\leq$0.1 to 0.3 OD |
|  | $D_{UDP\text{-}max}$ | $\geq$3.0 to 4.0 OD |

The following events will trigger calibration:

a) New emulsion number detected (via barcode on film pack).

b) Density patch data that exceeds the maintaining calibration threshold.

c) Customer request.

d) Time (hours).

The printer shall produce, at operator request, a 21-step calibration results film. The film image template will be the same as the calibration film except the code values shall be a linear 21-step series between 0 and 4095.

The initial step in characterizing the laser exposure scanner film, and thermal processor "open loop" response is with the 21-step calibration film. Following is the establish calibration procedure.

A 21-step calibration film 66 will be printed and processed.

The inline (embedded) densitometer 42 in the thermal processor 14 will read the density of each step and return these data to the controller 28.

The calibration software in controller 28, using an interpolation algorithm, will determine the "open loop" response and build the 4K code value to density response look-up-table. The laser CV to obtain $D_{UDP}$ is determined and set.

In the event that the algorithm fails based on $D_{min}$ or $D_{UDP}$, the following rule-base strategy will be used in an attempt to establish calibration based on the following threshold values for the Image Quality Specification X=0.1 to 0.3 OD
Y=3.0 to 4.0 OD
$TP_T$=Thermal Processor Temperature

TABLE 1

|  | UDP ≧ Y | UDP < Y |
|---|---|---|
| $D_{min}$ ≦ X | OK | Adjust $TP_T$ up |
| $D_{min}$ > X | Adjust $TP_T$ down | New film and call service |

The printer makes changes to the heater lamp of thermal processor 14 to establish calibration.

In the event that a process adjustment is required, the processor reaches the desired conditions after a delay before producing a step film.

Maintaining calibration is done by measuring film density patch data 80,82 (FIG. 4) obtained from each film 22 to track inter-sheet densitometric variability. Based on these data, the control 38 either makes changes to the thermal processor or initiates a new calibration. The calibration maintenance procedure is as follows.

The inline (embedded) densitometer in the thermal processor will read the $D_{min}$ and $D_{mid}$ density patches 80,82 on each film 22 and return these data to the control 28.

The control 28 calculates a weighted average for $D_{min}$ and $D_{mid}$.

A rule-based strategy (Table 2) is used in an attempt to maintain calibration.

The following aim data is used to determine the threshold values for maintaining calibration:

X=0.1 to 0.3 OD
Z=0.15 OD
$TP_T$=Thermal Processor Temperature

TABLE 2

|  | $D_{min}$ ≦ X | $D_{min}$ > X |
|---|---|---|
| $D_{mid}$ = D* ± 0.07 | OK | adjust $TP_T$ down |
| D*·Z ≦ $D_{mid}$ < D* | Adjust $TP_T$ up | adjust $TP_T$ down and adjust TPT down |
| D* + Z ≧ $D_{mid}$ > D* | adjust TPT down | adjust TPT down |
| $D_{mid}$ > D* + Z | trigger calibration | adjust TPT down and trigger calibration |
| $D_{mid}$ < D* − Z | adjust TPT up and trigger calibration | trigger calibration |

D* = Density produced at calibration for code value 2048
X,Y,Z are configuraable at the user interface The invention has been described in detail with particular reference to certain preferred embodiments thereof, but it will be understood that variations and modifications can be effected within the spirit and scope of the invention.

What is claimed is:

1. In a photothermographic laser imaging system including a laser printer for exposing photothermographic media to digital data, a thermal processor for thermally developing said exposed photothermographic media to render a visual image of the digital data and a densitometer for reading the density of said visual image, a method for establishing calibration of said system comprising the steps of:

reading optimum thermal processing parameters including processor temperature from a bar code associated with unexposed photothermographic media;

setting said thermal processor to operate at said read parameters;

exposing a calibration media by said laser printer, said calibration media including a multiple step gray scale pattern including a minimum density step, $D_{min}$, and an upper density step, $D_{UDP}$;

reading with said densitometer the densities of said multiple step gray scale pattern from the developed calibration media;

calculating a code value to optical density look-up-table from said read densities; and if said $D_{min}$ and $D_{UDP}$ values are within tolerances, using said calculated look-up-table to process successive media; but if said $D_{min}$ is greater than a predetermined value, adjusting said thermal processor temperature down, and if said $D_{UDP}$ is less than a predetermined value, adjusting said thermal processor temperature up.

* * * * *